(12) United States Patent
Appleyard et al.

(10) Patent No.: US 8,171,415 B2
(45) Date of Patent: May 1, 2012

(54) OUTAGE MANAGEMENT PORTAL LEVERAGING BACK-END RESOURCES TO CREATE A ROLE AND USER TAILORED FRONT-END INTERFACE FOR COORDINATING OUTAGE RESPONSES

(75) Inventors: James P. Appleyard, North Richland Hills, TX (US); Edwin J. Bruce, Corinth, TX (US); Romelia H. Flores, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 12/136,920

(22) Filed: Jun. 11, 2008

(65) Prior Publication Data

US 2009/0313562 A1    Dec. 17, 2009

(51) Int. Cl.
*G06F 15/177* (2006.01)
*G06F 3/00* (2006.01)
(52) U.S. Cl. .................. 715/747; 715/736; 715/741
(58) Field of Classification Search .............. 715/747, 715/736, 741
See application file for complete search history.

(56) References Cited

U.S. PATENT DOCUMENTS

| | | | |
|---|---|---|---|
| 6,343,290 B1 * | 1/2002 | Cossins et al. ............... | 1/1 |
| 6,456,306 B1 * | 9/2002 | Chin et al. .................... | 715/810 |
| 6,854,107 B2 | 2/2005 | Green et al. | |
| 7,019,753 B2 * | 3/2006 | Rappaport et al. ........... | 345/582 |
| 7,158,940 B2 | 1/2007 | Cimral et al. | |
| 7,447,509 B2 * | 11/2008 | Cossins et al. .............. | 455/457 |
| 7,796,534 B1 * | 9/2010 | Arnold et al. ................ | 370/254 |
| 7,890,870 B1 * | 2/2011 | Metters et al. ............... | 715/736 |
| 2002/0054086 A1 | 5/2002 | Van Oostenbrugge et al. | |
| 2002/0169852 A1 | 11/2002 | Schaeck | |
| 2003/0014560 A1 | 1/2003 | Mugica et al. | |
| 2003/0107596 A1 | 6/2003 | Jameson | |
| 2004/0001565 A1 | 1/2004 | Jones et al. | |
| 2004/0090969 A1 | 5/2004 | Jerrard-Dunne et al. | |
| 2004/0093381 A1 | 5/2004 | Hodges et al. | |
| 2004/0183831 A1 | 9/2004 | Ritchy et al. | |
| 2004/0225955 A1 | 11/2004 | Ly | |
| 2004/0249664 A1 | 12/2004 | Broverman et al. | |

(Continued)

OTHER PUBLICATIONS

Suri, J., et al., "Building Mashup Portlets," Sun Microsystems, Aug. 24, 2006. "A Primer on Enterprise Mashups: Productivity Drivers for the Web 2.0 Application Style," Kapow Technologies, 2007.

(Continued)

*Primary Examiner* — William Bashore
*Assistant Examiner* — David Phantana Angkool
(74) *Attorney, Agent, or Firm* — Patents on Demand; Brian K. Buchheit; Scott M. Garrett (57) ABSTRACT

A solution for centrally managing and federating outage specific information and for rapidly providing controlled access to this information in a role tailored fashion. The information can be gathered and provided in real-time along with programmatically determined proposed actions. An information recipient can configure and dynamically change the manner in which the information is presented, so that relevant information for that recipient can be rapidly digested. For example, a manager with a moderate level of technical knowledge may want information to be presented pictorially and in summary fashion, while a highly technical troubleshooter may want to configure information presentation to show key network statistics and values. In one embodiment, outage information can be presented in a Web portal having multiple discrete and customizable portlets, which include a geography portlet and a system portlet.

20 Claims, 7 Drawing Sheets

U.S. PATENT DOCUMENTS

| | | |
|---|---|---|
| 2005/0125772 A1 | 6/2005 | Kohno |
| 2005/0154701 A1 | 7/2005 | Parunak et al. |
| 2005/0267789 A1 | 12/2005 | Satyadas et al. |
| 2006/0184883 A1 | 8/2006 | Jerrard-Dunne et al. |
| 2006/0200308 A1* | 9/2006 | Arutunian .................... 701/208 |
| 2006/0235733 A1 | 10/2006 | Marks |
| 2007/0011126 A1 | 1/2007 | Conner et al. |
| 2007/0130561 A1 | 6/2007 | Siddaramappa et al. |
| 2007/0169016 A1 | 7/2007 | Aakolk et al. |
| 2007/0198312 A1 | 8/2007 | Bagchi et al. |
| 2007/0203766 A1 | 8/2007 | Adler et al. |

OTHER PUBLICATIONS

"SOA Workplace Portal: Emissions Dashboard", IBM Corp., Nov. 11, 2006.

Chen, I.Y., et al., "An SOA-based software deployment management system," 2006 IEEE/WIC/ACM Int'l Conf. on Web Intelligence, 2006.

"Interface for Creating Custom, End-User, Role Based Application Interface", Disclosure No. IPCOM13828D, IBM Corporation, Oct. 2000.

* cited by examiner

OUTAGE MANAGEMENT PORTAL LEVERAGING BACK-END RESOURCES TO CREATE A ROLE AND USER TAILORED FRONT-END INTERFACE FOR COORDINATING OUTAGE RESPONSES

BACKGROUND OF THE INVENTION

The present invention relates to outage management, and more particularly, to an outage management portal leveraging back-end resources to create a role and user tailored front end interface for coordinating outage responses.

Many companies conduct business operations using a network of managed resources. This network of managed resource can include any type of business resource that is subject to outages, such as a set of one or more information technology (IT) resources, a set of supply chain resources, components of a delivery system, a set of needed public utilities, personnel resources, and the like. One difficulty in controlling and maintaining these managed resources is to detect, diagnose, and remedy integrity troubles within the members. Common sources of trouble include adverse weather effects on physical components of a network of managed resources, equipment failures, user errors, software incompatibilities, and the like. Many of these conditions are extremely difficult to detect through traditional means, which often include engaging various support teams, who check their individual areas of responsibility to determine if "their" equipment/resources caused problems.

In a distributed computing example focused upon IT resources, network maintenance people will often "ping" a remotely located server to ensure that packages are able to pass between two end-points. Local hardware maintenance people will check statistics on their responsible machines, to make sure individual servers are operational. Software maintenance personnel will often check logs to determine whether a given software system has behaved or is behaving as intended. Testing discrete components in this fashion is often time consuming, which results in increased downtime. Further, this divide-and-conquer approach often minimizes combinative effects of interacting components. Additionally, this troubleshooting environment can become mired in administrative induced hurdles, as managers having limited areas of responsibility and/or one or more outsourced service companies can focus on assessing that their equipment is fine and that the problems are not their responsibility, as opposed to having everyone involved focusing upon cooperating to resolve the problem as quickly as possible. An analogous situation occurs for other types (non-IT resources) of managed resources.

An unfortunate reality of present systems for managing a network of resources is that back-end operations data is often "trapped" within subsystem boundaries. For the computing example, server information is often localized to a given server, intranet metrics are only exposed to an intranet management team, and the like. These subsystem boundaries often exist as barriers imposed to protect the safety and integrity of the systems. A totality of existent, but often unavailable, back-end data can provide a relatively clear "picture" of a distributed system, which can be invaluable for successfully handling outages in a timely fashion. Additional information, when properly organized concerning factors outside the back-end data (e.g., weather patterns, Internet communication surges, location specific emergencies such as fires, floods, and hurricanes) can further assist troubleshooting and resolution efforts. At present, troubleshooters are not provided with all relevant information existent for handling outages, whether they involve networks of a computing or non-computing (public utilities, supply chains, or any transportation/delivery network, for that matter) nature.

BRIEF SUMMARY OF THE INVENTION

One aspect of the present invention can include a method, computer program product, system, and/or device for implementing a role based outage management workplace. In this aspect, an outage management system can be identified that provides interface customizations based upon at least one of an identified user and a user role. An outage management workplace can be constructed from the interface customizations. The outage management workplace can include multiple views (e.g., portlets in one embodiment). Each view can include view-specific programmatic code, which is able to be rendered and utilized independent of that for other views. Thus, the various views can be separately implemented, and can be added or removed from the outage management workplace without affecting the operations of the other views of the outage management workplace. The state of one view can, however, affect the state of at least one other view, so that content changes and user interaction-based changes made to one view can result in corresponding changes reflected in at least one other view. The outage workplace computing environment can be presented from a network server to a client rendering, whether it be of a "fat" (i.e., full-function product for separate installation) or "thin" (i.e., Web browser) implementation.

Views emanating from the outage workplace can include one that graphically presents spatially related geographic data shown on a map, and corresponds to a geographically distributed, networked environment. Another view can include a system perspective, presenting a schematic for a specific member of the geographically distributed networked environment. The geographically oriented view can be configured to present the overall set of network members upon its map, and the selection of one of those within the geographic view can result in the corresponding presentation of data relating to the selected member in the system view.

Another aspect of the present invention can include an outage workplace Web portal including multiple portlets. One of these portlets can include a geography portlet, which could be a "mashup" comprising a visual map and related interface controls, as well as overlaid content relating to an outage within a distributed networked environment of resources. The overlaid content can be based upon information dynamically obtained from a plurality of network accessible data sources. An additional system portlet can include a schematic of a resource or subsystem included within the distributed networked environment. Such a schematic can present real-time information pertaining to the condition and status of the resource or subsystem being monitored, whether it is of a computing or service delivery nature. The overlaid content at the geography portlet can include a set of user selectable objects, each corresponding to a different networked resource. A selection of one of the user selectable objects in the geography portlet can result in the system portlet's dynamically changing to present content related to the selected resource. The geography portlet and the system portlet can be customized in accordance with a role of a user and with user established customization settings.

Still another aspect of the present invention can include a portal server for the creation and service of role customized outage workplace portals. The portal server can use role specific programmatically implemented customizations for providing role tailored portals. The roles can include an executive role, an operational role, and a maintenance role, each tailored for the presentation of outage information to different groups of users. A data store used by the portal server can manage digitally encoded customization settings. The customization settings can be associated with specific users and can include user established settings. The programmatically implemented customizations can be configured for utilization when outage workplace portals are served to users. The portal server can also include fetching software configured to dynamically obtain outage information from at least one back-end data source. Portlet creation software can also be included that modifies a software artifact obtained from at least one presentation source to include data points based upon the obtained outage information. The portlet creation software can utilize the customization settings from the data store when generating portlets for specific users. Portal binding software can be used to insert code into an outage management portal, which programmatically links otherwise independent portlets. The inserted code can cause the state of at least one of the portlets to dynamically change based upon at least one of a user interface and a data update to another of the portlets of the outage workplace portal. The portal server can also include a component configured to respond to requests from remotely located clients by serving customized outage workplace portals to them. The served outage workplace portals can include at least a geography portlet and a system portlet, both delivering outage related information for a distributed networked environment.

DETAILED DESCRIPTION OF THE INVENTION

A solution for centrally managing and federating outage specific information and for rapidly providing controlled access to this information in a role tailored fashion. The information can be gathered and provided in real time, along with programmatically determined proposed actions. An information recipient can configure and dynamically change the manner in which information is presented, so that relevant information for that recipient can be rapidly digested. For example, a manager with a moderate level of technical knowledge may want information to be presented pictorially and in a summary fashion, while a highly technical troubleshooter may want to configure information presentation to show key networked resource statistics and values. One aspect of the present invention utilizes Web 2.0 interfaces tied to information federation sources, yet which permit customized views. The Web 2.0 interfaces can further include communication, collaboration, and response management facilitation tools, such as for instant messaging (IM), e-mail, co-browsing, video sharing, presence detection, presentation and the like. In one embodiment, outage data can be acquired and federated using a series of Web services provided by service oriented architecture (SOA) components.

It should be appreciated that the use of SOA, roles based portals, federated data approaches, mashups, collaboration and other techniques are each individually "well known in the art." What is unique about the presented solution is a combination of these techniques and components to create a state of the art outage system. This outage system is able to address various business challenges for the various user roles. Further, the solution embraces a use of real-time information in an intelligent fashion to present the appropriate data to the appropriate user at the appropriate time. Additionally, the solution leverages existing information sources and is able to be cost effectively adapted as technologies, data sources, presentation source, and business goals change.

The present invention may be embodied as a method, system, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport a program for use by or in connection with an instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, RF, etc.

Any suitable computer-usable or computer-readable medium may be utilized. The computer-usable or computer-readable medium may be, for example but not limited to, an electronic, magnetic, optical, electromagnetic, infrared, or semiconductor system, apparatus, device, or propagation medium. Examples of computer-readable media include a semiconductor or solid state memory, magnetic tape, removable computer diskette, random access memory (RAM), read-only memory (ROM), erasable programmable read-only memory (EPROM or Flash memory), rigid magnetic disk and an optical disk. Current examples of optical disks include the Compact Disc-Read Only Memory (CD-ROM), Compact Disc-Read/Write (CD-R/W) and the Digital Video Disc (DVD). Other computer-readable media can include transmission environments (such as those supporting the Internet, an Intranet, or a Personal Area Network (PAN)), and magnetic storage devices. Transmission media can include an electrical connection having one or more wires, an optical fiber, an optical storage device, and a defined segment of the electromagnet spectrum through which digitally encoded content is wirelessly conveyed using a carrier wave.

Note that computer-usable or computer-readable media can even include paper or another suitable medium upon which a program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
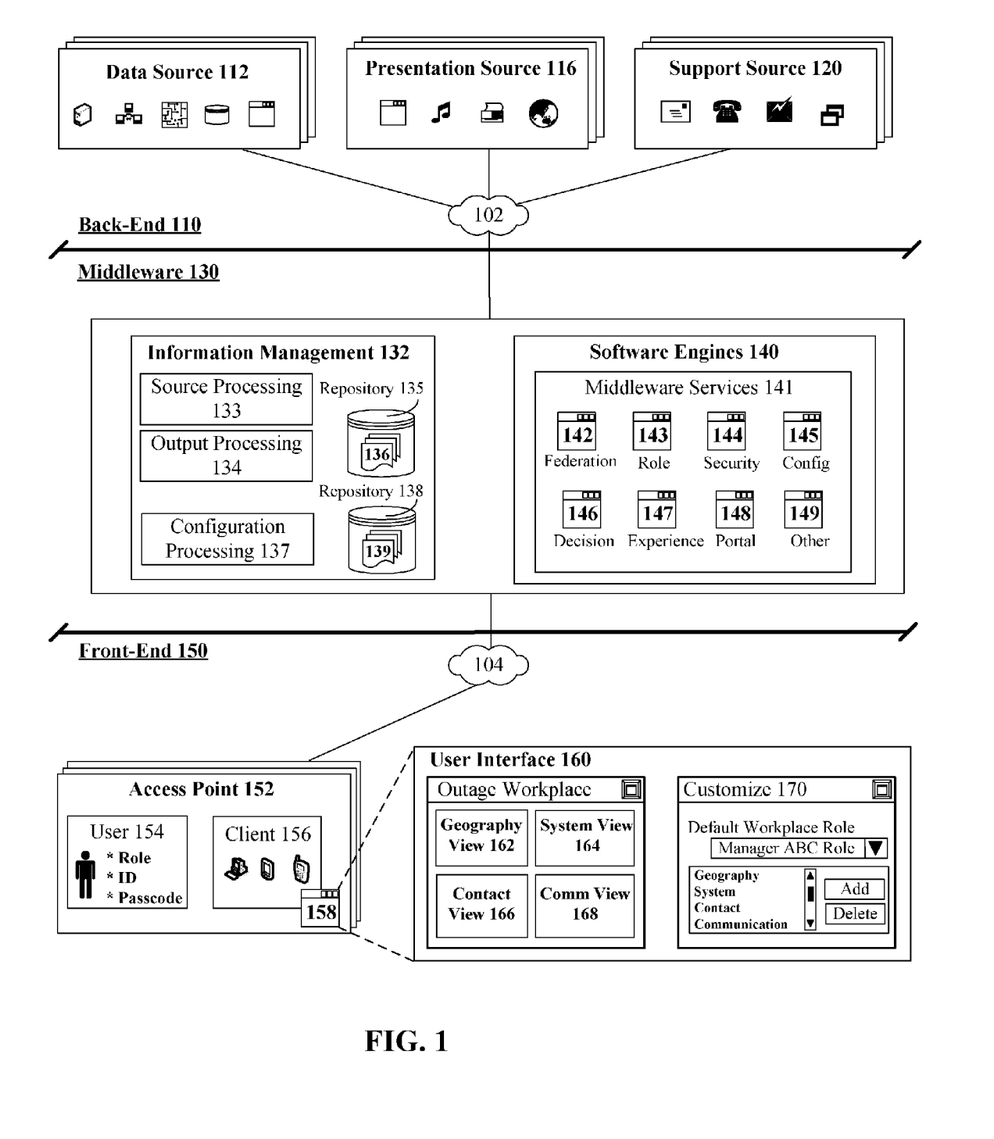
FIG. 1 is a system for implementing a roles based outage management workplace in accordance with an embodiment of the inventive arrangements disclosed herein.

FIG. 1 is a system 100 for implementing a roles based outage management workplace in accordance with an embodiment of the inventive arrangements disclosed herein. System 100 brings a set of disparate data sources 112, presentation sources 116, support sources 120, and the like together in a distributed computing space (middleware environment 130 and front-end 150). In this computing space 130-150, a customized, role tailored workplace can be created. This workplace is a front-end 150 accessible expression of outage related content tailored for a given user 154. Further, the tailored outage workplace can be implemented for a client 156 using industry standards, such as standardized Web based protocols and technologies, which permit the outage workplace to be presented in a standard browser 158. In one embodiment, system 100 can utilize Web 2.0 style attributes, such as "mashups", AJAX, Web services, instant messaging, "wikis", "blogs", syndication feeds, and the like to arm users 154 with data integration, data presentation, communication, collaboration, and other capabilities for handling outage related issues.

The browser 158 can be used as a user interface 160 in which multiple programmatically linked views 162-168 are presented in a customized fashion. In one embodiment, each of these views 162-168 can represent a portlet and the outage management workplace's user interface 160 can be a portal. Content of the outage management workplace's user interface 160 can vary depending upon user role. Typical content for a user interface 160 can include, but not be limited to, geographic or mapping information, detailed schematics, system models, and/or scorecard displays. The workplace's user interface can also include components for alerts, directory lookup, instant messaging support, reference document display, "wiki"-style mass collaborative authorization and searching, and the like.

Portals/portlets are just one contemplated technology for expressing the outage workplace in a user-interactive manner, and a realization of the inventive arrangements described herein is not to be limited to a specific technology or set of technologies. In one embodiment, for example, a series of Web enabled widgets or desktop gadgets (considered browsers 158 for purposes of system 100) on an active desktop of client 156 can be used to interactively present different ones of the views 162-168.

The views 162-168 can include any number of discrete interface sections related to outage management including, but not limited to, a geography view 162, a system view 164, a contact view 166, a communication view 168, a situation response view, an action item view, a forecast view, and the like. Customization interface 170 can be used to change behavior and settings for existing views 162-168, adding a different view to an outage workplace, or creating a new user-designed view 162-168, etc.

The various views 162-168 can interoperate. For example, selecting a given system object in a geography view 162 can change the system presented in a system view 164. In another example, when parties included in the communication view 168 communicate with a user 154, bibliographical and summary data for those people can be presented in a contact view 166, assigned tasks involving the parties can be presented in a situation response view, presence information for the parties can be displayed in the geography view 162 (e.g., points for where communicators are located can be displayed on a map), and the like. Views 162-168 can be dynamically and automatically updated as new information becomes available. In one embodiment, one or more of the views 162-168 can present real-time and/or near-real-time information acquired from back-end 110 systems.

System 100 can provide mechanisms to acquire information from multiple loosely coupled systems, to aggregate this information in accordance with a set of outage specific rules into a standardized format, and to then process this standardized information in a user tailored manner. An information management 132 segment of middleware 130 can acquire data from the data sources 112. A source processing component 133 can transcode, reformat, convert, and otherwise process the acquired data from an original form into standardized output data 136, which can be stored in a data repository 135. In one embodiment, a number of data source 112 plug-ins can be used to convert the data conveyed over network 102 from the back-end 110 to the middleware 130 layer. In another embodiment, the middleware 130 can utilize a data conversion gateway to standardize the externally acquired data.

In one embodiment, the information management component 132 can also process output 134 from a standardized format to a format specific to a given presentation source 116. For example, a presentation source 116 can incorporate a "mashup" that includes customized points overlaid upon a geographic map. The output processing component 134 can adjust the format of the data 136 to conform to that needed for a given presentation source 116.

The information management component 132 can also include a configuration processing component 137, which can store end-user customizations 139 in repository 138. These customizations 139 can be established by interface 170 or any other configuration mechanism.

The information management component 132 can also include a set of programmatic rules and routines to integrate middleware 130 components with support sources 120, such as e-mail servers, telephony systems, calendaring systems, and the like.

Further, middleware 130 can include one or more software engines 140, which provide one or more middleware services 141. These services 141 can include, for example, federation services 142, role services 143, security services 144, configuration services 145, decision services 146, experience services 147, portal services 148, or other services 149. In one embodiment, the services 141 can include one or more Service Oriented Architecture (SOA) services. One or more information management 132 components and routines can optionally be implemented as middleware services 141.

As used herein, each of the data sources 112 can be a definable location for obtaining outage information. These data sources 112 can include URL-addressable resources, sensor input linked resources, and the like. Many of the data sources 112 can have internal security, which can be centrally handled (e.g., suitable passwords and identification credentials) by one or more security services 144. Subscription data sources 112, broadcast data sources 112, static data sources 112, and the like can be included in system 100. Further, a user 154 or administrator can dynamically define new data sources 112 and/or change specifics of existing data sources 112. In one embodiment, reconciliation rules can be established to determine which of the many data sources 112 is to be granted priority over other sources 112 when data conflicts occur. Many of the data sources 112, if not all, can be commercial data sources for outage related information. Data sources 112 can include, but are not limited to, network monitoring sources, system monitoring sources, weather sources, and the like.

The presentation sources 116 can include a variety of sources and mechanisms linked to various views 162-168. The sources 116 can include Web 2.0 sources, such as "wikis", syndication feeds, "mashups", and the like. Views 162-168 can represent a filtered, customized, or otherwise manipulated version of data dependent upon one of the presentation sources 116. Presentation sources 116 can be included in the middleware 130 or can be independent of it. For example, the middleware 130 can utilize capabilities of an external mapping presentation source 116 to provide a geography view 162 complete with outage customized points. For example, the geography view 162 can use GOOGLE MAPS or YAHOO MAPS as a presentation source 116.

The support sources 120 can represent one or more systems or applications integrated with the outage management system, and can include stand-alone systems having a directed purpose. Content from the support sources 120 can be formatted for presentation in one or more of the views 162-168. Support sources 120 can encompass scheduling systems, content management systems, task tracking systems, communication systems, and the like. For example, an e-mail system and/or an instant messaging system can be one of the support systems 120, and can provide a communication capability to an outage workplace interface 160. In another embodiment, a calendaring system can be used to track tasks assigned to outage personnel during an outage event and/or to provide a responder with contact information used to communicate with another outage response team member. The views 162-168 tailor extracted information to a user's 154 desires and to a specific outage scenario, all of which can be a data-driven process.

The middleware 130 can be software that functions as an intermediary between two or more applications that would not otherwise be able to intercommunicate. The middleware 130 can provide for interoperability in support of a move to coherent distributed architectures. Middleware 130 can utilize any number of different standardized technologies, including Extensible Markup Language—(XML) based technologies, Simple Object Access Protocol (SOAP) mechanisms, Web services, service oriented architecture (SOA) structures, and the like. Middleware 130 can include IBM WebSphere Application Server (WAS), IBM WEB PORTAL, IBM Tivoli Management Framework (TMF) components, an Organization for the Advancement of Structured Information Standards (OASIS) compliant SOA architecture, a JAVA 2 ENTERPRISE EDITION based middleware structure, a Common Object Request Broker Architecture-(CORBA) based set of services and components, a .NET-based set of services and components, and the like.

The management information component 132 can be a software implemented component configured to assist with a management any network of manageable resources. These managed resource can be associated with computers, public utilities, supply chains, delivery systems, personnel, and/or any other type of resource that is capable of being interconnected (and managed) so long as the network of managed resources could possibly suffer from an "outage." An outage can refer to any situation that affects an availability of a resource and/or an ability of a network of these resources to interoperate. A set of IT resources can be a subset of the resources managed by the information management component 132. Further, an outage can occur, even though all IT resources managed by component 132 are in a functional operational state. For example, a logistical transportation vehicle (e.g., truck, train, plane, etc.) that delivers supply chain materials can be unavailable, which results in an outage situation that must be handled with the assistance of component 132. In such a situation, IT resources (supply chain management systems, manufacturing systems, etc. are fully functional, yet an "outage" occurs.

A front-end 150 access point 152 can be used to communicate with middleware 130 via network 104. An access point 152 can include a user and a client 156 connected to network 104. Each of the clients 156 can be a computing device capable of presenting Web content within a browser 158. Each client 156 can include, for example, a desktop computer, a server, a mobile telephone, a tablet computer, a personal data assistant (PDA), a digital media player, and the like.

A browser 158 can include any software application able to interactively present user interface 160. The browser 158 can be an application used to view and navigate the World Wide Web and other Internet resources. The browser 158 can include a rich internet interface (RII), a REST client, and other software for rendering views 162-168.

The user interface 160 can include a graphical user interface, a voice user interface, a text interface, a multimodal interface, and the like. In one embodiment, the user interface 160 can be a portal or a series of portals (e.g., multi-page Web application). Each portal can include multiple Web portlets 162-168, which can vary according to the role of a user.

A role can be based upon a position in an organizational hierarchy or upon a responsibility area in regards to an outage, and the like. Roles can be keyed to areas of responsibility, a skill set, an authorization level, functional lines, and/or can be specific to particular positions. Sample roles for an outage scenario include, but are not limited to those of a company executive, an "operations person", and a maintenance crew member.

Each of the components of system 100 can be interconnected through one or more data networks, which include network 102 and network 104. These networks can include any hardware, software, and firmware necessary to convey data encoded within carrier waves. Data can be contained within analog or digital signals and conveyed though data or voice channels. Networks can include local components and data pathways necessary for communications to be exchanged among computing device components and between integrated device components and peripherals. The networks can also include their comprising equipment, such as routers, data lines, hubs, and intermediary servers which together, form the data network. Networks can further include circuit-based communication components and mobile communication components, such as telephony switches, modems, cellular communication towers, and the like. Finally, networks can include line-based and/or wireless communications pathways.

System 100 can store digitally encoded information in a set of one or more data stores, such as repository 135 and 138, which are accessible by system 100 components. These data stores can be physical or virtual storage spaces configured to store digital information. The data stores can be implemented with any type of hardware, including, but not limited to, a magnetic disk, an optical disk, a semiconductor memory, a digitally encoded plastic memory, a holographic memory, or any other recording medium. Each of the data stores can be a stand-alone storage unit as well as a storage unit formed from one or more physical devices. Additionally, information can be stored within the data stores in a variety of manners. For example, information can be stored within a database structure or can be stored within one or more files of a file storage system, where each file may or may not be indexed for information searching purposes. Further, the data stores can optionally utilize one or more encryption mechanisms to protect stored information from unauthorized access.

Figure 2:
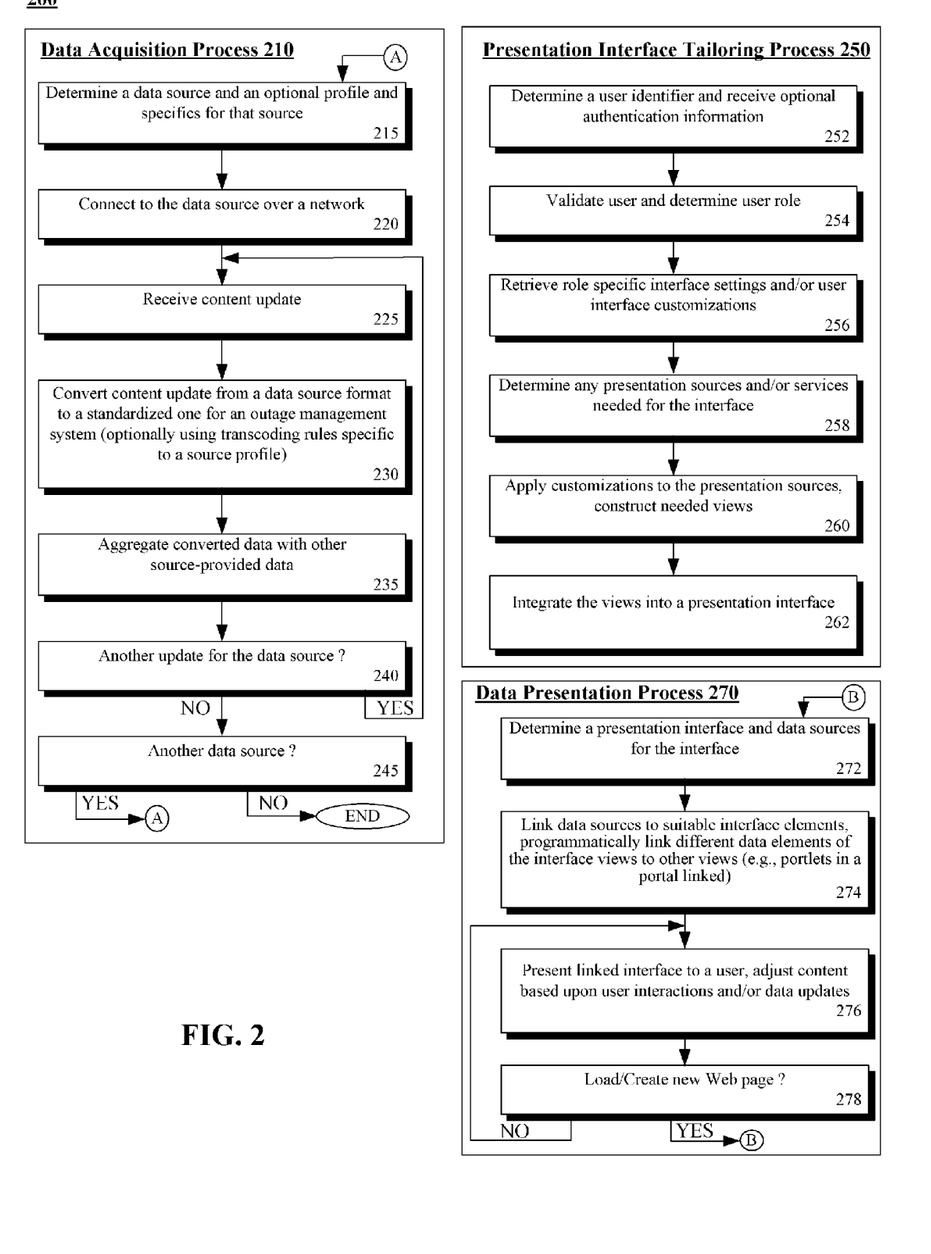
FIG. 2 is a set of flow charts illustrating methods of acquiring outage data, of tailoring a presentation interface based upon user/role, and of presenting outage data within this interface in accordance with an embodiment of the inventive arrangements disclosed herein.

FIG. 2 is a set of flow charts illustrating a method 200 of acquiring outage data 210, of tailoring a presentation interface 250 based upon user/role, and of presenting outage data within this interface 270 in accordance with an embodiment of the inventive arrangements disclosed herein. The method 200 can be performed within the context of system 100. The processes 210, 250, 270 shown for method 200 can occur independently of each other; however, the needs of one or more of the processes 210, 250, 270 can drive the others.

The data acquisition process 210 can begin in step 215, where a data source and an optional profile and source specifics can be determined. The data source can be any source of information, (i.e., public, trusted, or secure) which relates to outages. In step 220, a connection can be established with the determined data source, such as via a network. In step 225, a content update can be received from the data source.

In step 230, received "raw" content can be converted from a data source format to a standardized format used by an outage management system. In one embodiment, transcoding and/or conversion rules can be established by a source profile, which can be a plug-in for handling content from a given source. Thus, the data acquisition process 210 can be a pluggable one, within which new content sources can be added through the use of associated plug-in modules. In step 235, converted data can be aggregated with other source-provided data. In step 240, a determination can be made as to whether additional updates exist or are to be determined for the data source. If so, the process 210 proceeds from step 240 to step 225. Otherwise, step 245 can execute where another data source can be queried for data updates, shown by progressing from step 245 to step 215. When other data sources are not to be checked, a cycle of the process 210 ends, to be repeated at intervals or triggered based upon an occurrence of a detectable programmatic event.

In one embodiment, the data acquisition process 210 can synchronize remote data sources with an outage management data repository. In another embodiment, no persistent outage management data repository is necessary, and data can be dynamically acquired (and possibly converted) directly from a source on demand. Implementations can use a combination of a persistent outage management data repository for some data sources and direct data utilization from other data sources.

The presentation interface tailoring process 250 can dynamically create role and/or user specific outage management workplaces (e.g., user interfaces). In step 252, a user identifier can be determined and optional authentication information can be received. Authentication information can include any security information, such as a device identifier, a user identifier, a passcode, a digital certificate, a biometric input, and the like. In step 254, a user can be validated and a user's role in the context of the outage workplace can be determined. It is possible for a user to have multiple roles within an overall outage system, in which case the user can be prompted to select a desired role during step 254.

In step 256, role specific interface settings and/or user specific interface customizations can be retrieved for the user. In step 258, a determination can be made as to any presentation sources and/or services that are needed for the user's outage workplace. For example, the outage workplace (user interface) can be a Web portal that includes any number of portlets. One of these can incorporate a "mashup", which relies on a presentation source to provide a base map, upon which outage specific data is overlaid. In step 260, customizations to the presentation sources/services can be applied and views (e.g., portlets) can be constructed as needed. These views can be integrated into the presentation interface (e.g., portal), as shown by step 262. In one embodiment, the integration of the various views, each of which can be associated with different URL-addressable software artifacts, can be performed at this stage. That is, programmatic linkages can be established so that interactions occurring in one of the views fires an event, which changes the state of another one of the views, thus altering content presented therein. Thus, different portlets (or views) related to outages can be programmatically linked to other portlets within a served portal in a unified and customized fashion.

The data presentation process 270 is a process through which a customized interface (e.g., an outage workplace) is loaded with suitable data. In step 272, a presentation interface and data sources for that interface can be determined. In step 274, data sources can be linked to suitable interface elements. These links can be interactive and dynamically created programmatic links, which also link various views to other views (or portlets to other portlets). In step 276, a linked interface can be presented to a user, and content can be dynamically adjusted based upon user interactions and/or data updates. Changes based upon data updates can be particularly important for outage workplaces that show real-time and/or near-real-time data. As previously mentioned, user interactions in one view can result in changes to another view. For example, a selection of a location in a geographic view (e.g., portlet) can result in a corresponding system being presented in a system view (e.g., portlet). Step 276 can repeat unless a new Web page or portal is selected or navigated to. In this case, the process 270 can progress from step 278 to step 272, where specifics for the new Web page can be determined and this new page can be populated with suitable interface and data elements. It should be noted that an outage management application can be a multi-page application having from 1 to N number of pages.

Figure 3:
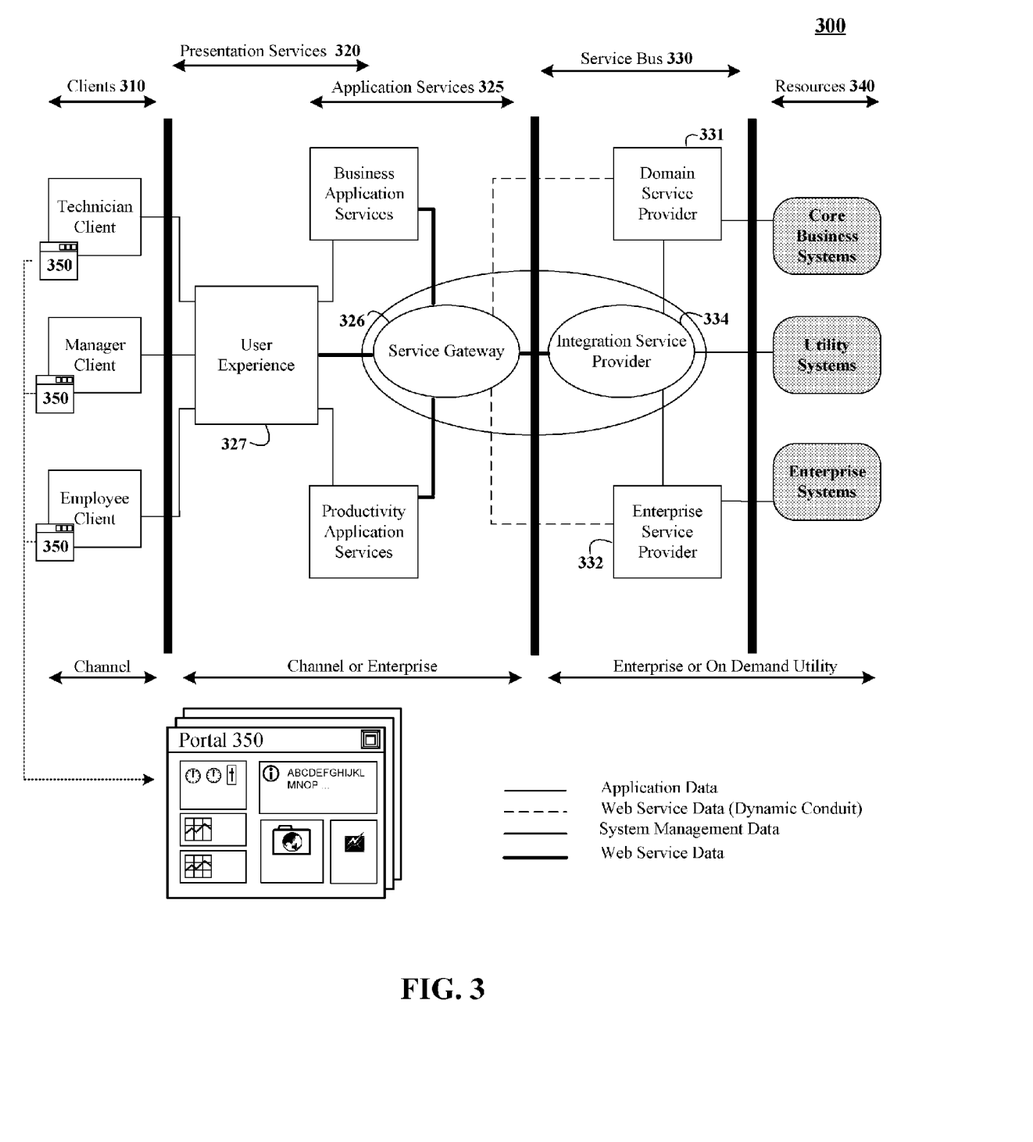
FIG. 3 is a schematic diagram of a service oriented architecture (SOA) implementation of a role tailored outage workplace in accordance with an embodiment of the inventive arrangements shown herein.

FIG. 3 is a schematic diagram of a service oriented architecture (SOA) 300 implementation of a role tailored outage workplace 350 in accordance with an embodiment of the inventive arrangements shown herein. The loosely coupled nature of an SOA 300 can be advantageous in connecting back-end resources 340 via a service bus 330 to a service gateway 326 for use by a user experience component 327. The SOA 300 environment can also make customizing user experiences for different clients 310 easier than would be possible with a more rigid architecture.

As shown, for example, a portal 350 workplace and its portlets can map to layer 310 of the SOA 300. Multiple user roles and their associated Web browsers can access the presentation 320 and application services 325. The presentation 320 and application services 325 can include the user experience portal server and various support applications, such as an organizational directory, instant messaging, and content management (library) systems. The SOA 300 can bifurcate presentation services 320 from application services 325, which can foster configurable end-user experiences while ensuring consistent handling of organizational information.

The resources 340 portion of the SOA can be involved with the provisioning of data required to drive measurements, historical/trending, and marketplace portions of the portal 350 workplace. Various back-end, enterprise-level systems can yield direct or to-be-federated (such as by a federation service) data. Resource 340 contributions must be fetched, coordinated, and appropriately transformed. The use of domain 331 and enterprise 332 service providers allows the isolation and insulation of back-end systems (340), while allowing access to their functions via Web service interfaces. The integration service provider 334 can integrate information from the other service providers 331, 332 and can communicate with a service gateway 326. The service gateway 326 can implement dynamic binding, request/response decomposition/composition, and content-based routing of document-literal Extensible Markup Language (XML) requests generally arriving via Web services, and can additionally provide wire protocol conversion if necessary.

More specifically, the integration service provider 334 can serve as a reference system for service routing and versioning as well as the handler for complex requests and processes not addressable by the service gateway 326. All of the middleware 326, 334 and back-end adapter 331, 332 components combine to standardize, normalize, and flexibly implement the loose coupling that is an SOA strength. All serve to optimize the presentation and application services' 320, 325 access to back-end systems 340; the middleware components 326 and 334 may be used to cache fetched data and obviate the need for full round trips (portal 350 to back-end resources 340) where possible.

Taking the above into account, and for the portal 350 workplace, the presentation and application services 320, 325 (largely implemented with the portal server and collaboration technology) can use client libraries for the conversion of Java Bean-based requests into document-literal XML ones, which are transmitted to the service gateway 326 for decomposition (many to individuals) and routing. When near-real-time Web portlet objects are generating requests possibly via AJAX, those end up being transmitted via Web service calls to the service gateway 326, which enables access to data cached in the service bus 330 or requested of the appropriate resource 340. Responses can be sent back to the service gateway 326, which will cache appropriate data and compose a total response to match all facets of the original request. Subsequent requests can be matched with cached data before it expires, thereby extending the time before another "full round trip" to one or more back-end resources 340 becomes necessary.

The same approach as above can be taken for a possible "marketplace" portion of the portal 350 workplace, as dynamic data relating to on demand resources (such as for purchasing parts in a resource network outage scenario) can be accessed once again through the user experience component 327, the service gateway 326, the integration service provider 334 (if needed), and an appropriate service provider 331-332.

In cases where multiple service providers 331-332 and back-end systems 340 must contribute to federated responses or where multi-step business processes must be run for analysis or report aggregation purposes, the integration service provider 334 can be utilized. Possessing business process choreography capabilities, the integration service provider 334 is able to handle requests involving conversions and synthesis that the service gateway 326 cannot. As response routing does go back through the service gateway 326, however, the ability to capture complex results in temporary cache is still present, and can be leveraged by the service gateway 326 for subsequent requests. An example of a request requiring aggregation of data from various back-end resources might be when the portal 350 workplace fetches past, present, and future prediction information in one request for the display of history and trends for a given measure (such as system reliability). The integration service provider 334 provides the request decomposition and process steps to access each contributing back-end system, and then aggregates the responses to form one "answer."

In summary, the "visible" portion of the portal 350 workplace leverages the "invisible" portion 320, 325, 330, 340 provided by the SOA infrastructure in order to access the various pieces of data required to drive its mix of portlets. The employment of client-side Java Beans for convenience, document-literal XML for transformation, content-based routing, dynamic binding, multi-step request handling, and Web service enablement of back-end resources contributes to this goal.

It should be emphasized that the architecture 300 is shown for illustrative purposes only, and that the scope of the invention is not to be limited in this regard. For instance, other SOA approaches not having an integration service provider 334 component can be used to implement the portal 350 functionality. Other architecture types, such as RESTful ones, can also be used to functionally implement portal 350 in different invention embodiments.

Figure 4:
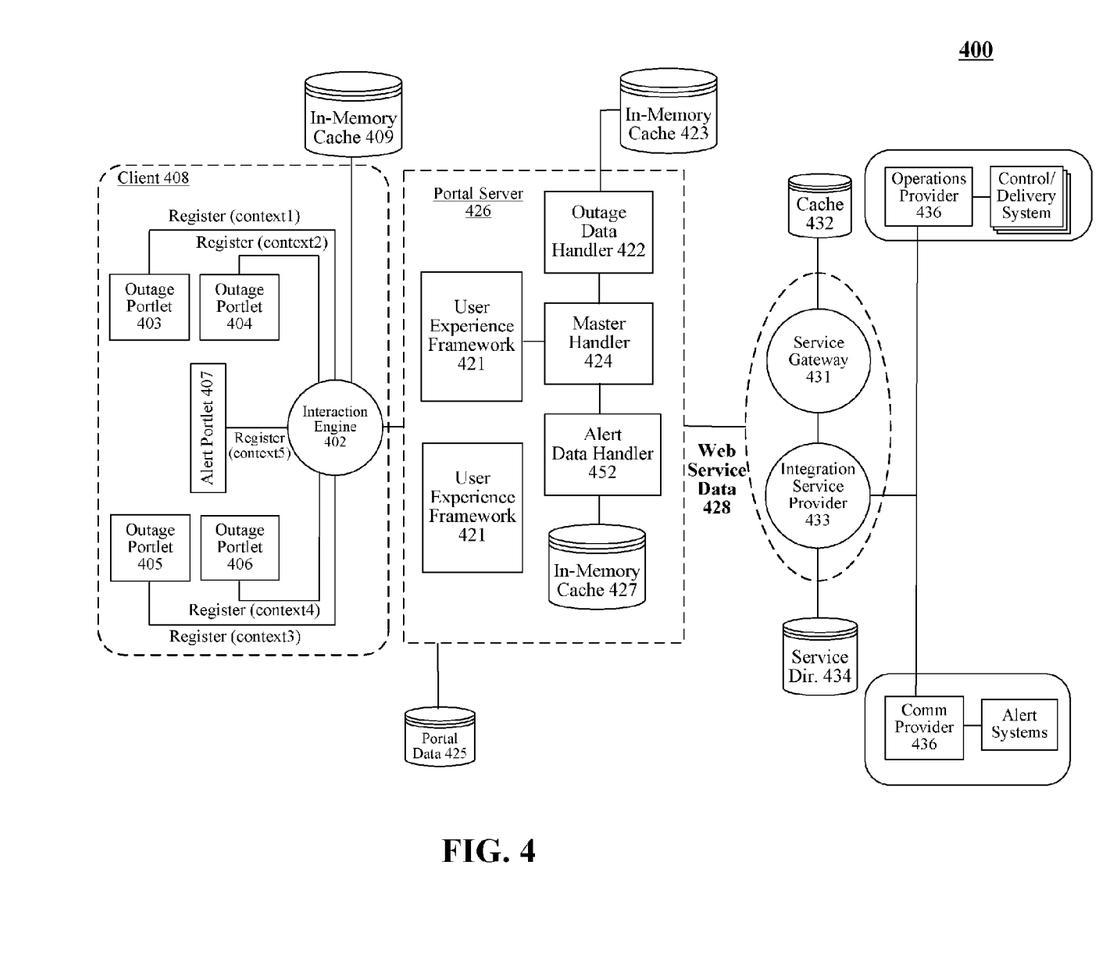
FIG. 4 is a schematic diagram of a system showing a specific implementation of a SOA in a context of an outage management solution.

FIG. 4 is a schematic diagram of a system 400 showing a specific implementation of SOA 300 in a context of an outage management solution. That is, outage specific metrics can be presented within outage portlets 403-406 in a configurable fashion. An interaction engine 402 can compare current operational/outage metrics against previously defined boundaries to determine if an outage event has occurred. If so, an alert to this effect can be posted to an alert portlet 407. Additionally, other portlets (not shown) can respond to the outage event. The client 408 to which the outage portal is associated can optionally utilize an in-memory cache 409 to improve performance, which can be a significant factor if some operational/outage-related data is to be presented in real-time or near real-time fashion.

For example, each portlet 403-407 of client 408 can utilize interaction engine 402 to interface with the portal server 426. In-memory cache or data store 409 can be used to store information specifying data sources for updating the portlets 403-407, such as the URLs for associated Web sites. Data store 409 can also separately store and track foreground (presented) information for the portlets 403-407 and background (hidden) information.

The portal server 426 of system 400 can include a user experience framework 421, a master handler 424, an outage data handler 422, and an alert data handler 452. Caches 423, 427 and data store 425 contain information which can also be used by the portal server 426. The client 408 can communicate with the portal server 426 via a network infrastructure (not shown). Authorization engines (not shown) can ensure security of portlet data.

The user experience framework or engines 421 can interface with specific clients 408. The user experience engines 421 can be communicatively linked to a registration handler (not shown), a master handler 424, and data handlers 422, 452 as shown. Each data handler 422, 452 can be associated with a memory cache 423 and/or 427, which store frequently updated data and related pertinent update frequency information. Handlers 422, 424, 452 can together ensure that data presented within client 408 portlets and obtained from providers 436 is continuously updated.

In one embodiment, user experience engines 421 can customize enterprise content for specific user roles or communication channels such as a customer channel, an employee channel, a management channel, an IT administrator channel, and the like. The communication channels can also be linked to different market channels, such as employee systems, kiosks, self-service Web sites, and the like. Accordingly, the user experience engines 421 can customize streams of enterprise data obtained from an enterprise infrastructure for different front-end systems. Segmenting enterprise data from different front-end systems used by clients 408 in such a loosely coupled fashion ensures that enterprise data can be utilized by different, separately customizable systems without negatively affecting back-end systems.

Information can be conveyed as Web service data 428 to the portal server 426 via a service gateway 431, which is connected to an integration service provider 433. Other providers 436 can exist, which communicate with the gateway 431 and/or the integration service provider 433. A service directory 434 can specify the types of services available within system 400. Middleware components 431, 433 can optionally use one or more memory caches 432 to improve overall system 400 performance.

Figure 5:
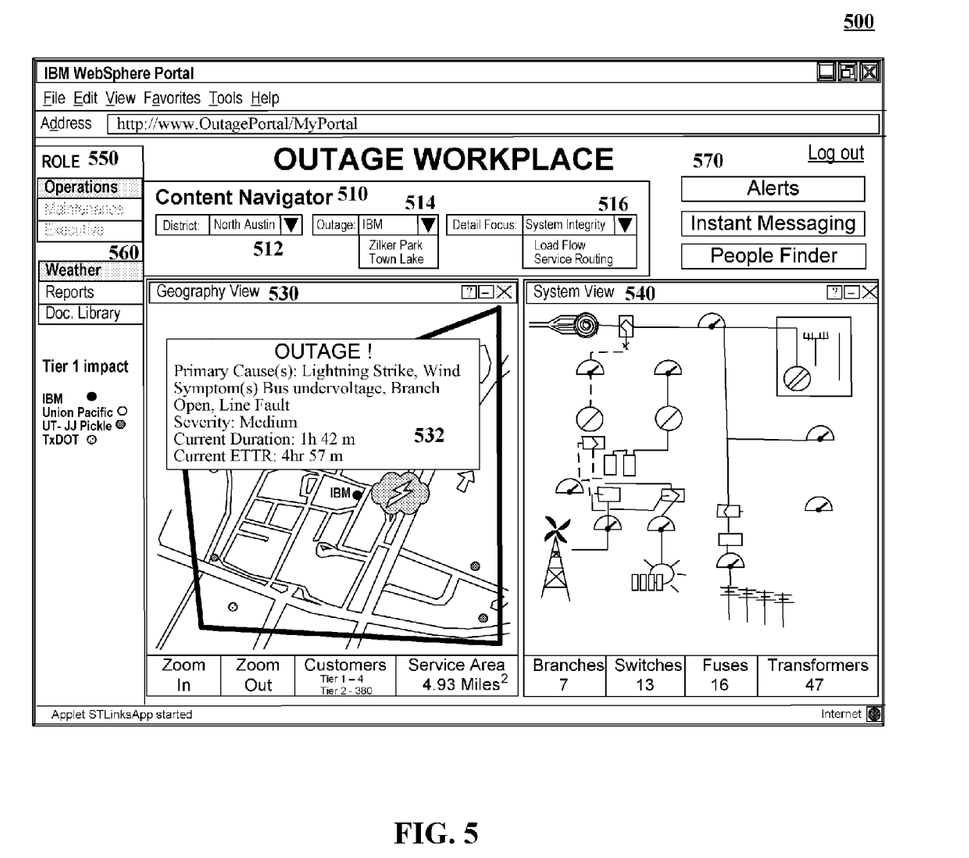
FIG. 5 is a diagram of a sample outage workplace in accordance with an embodiment of the inventive arrangements disclosed herein.
Figure 6:
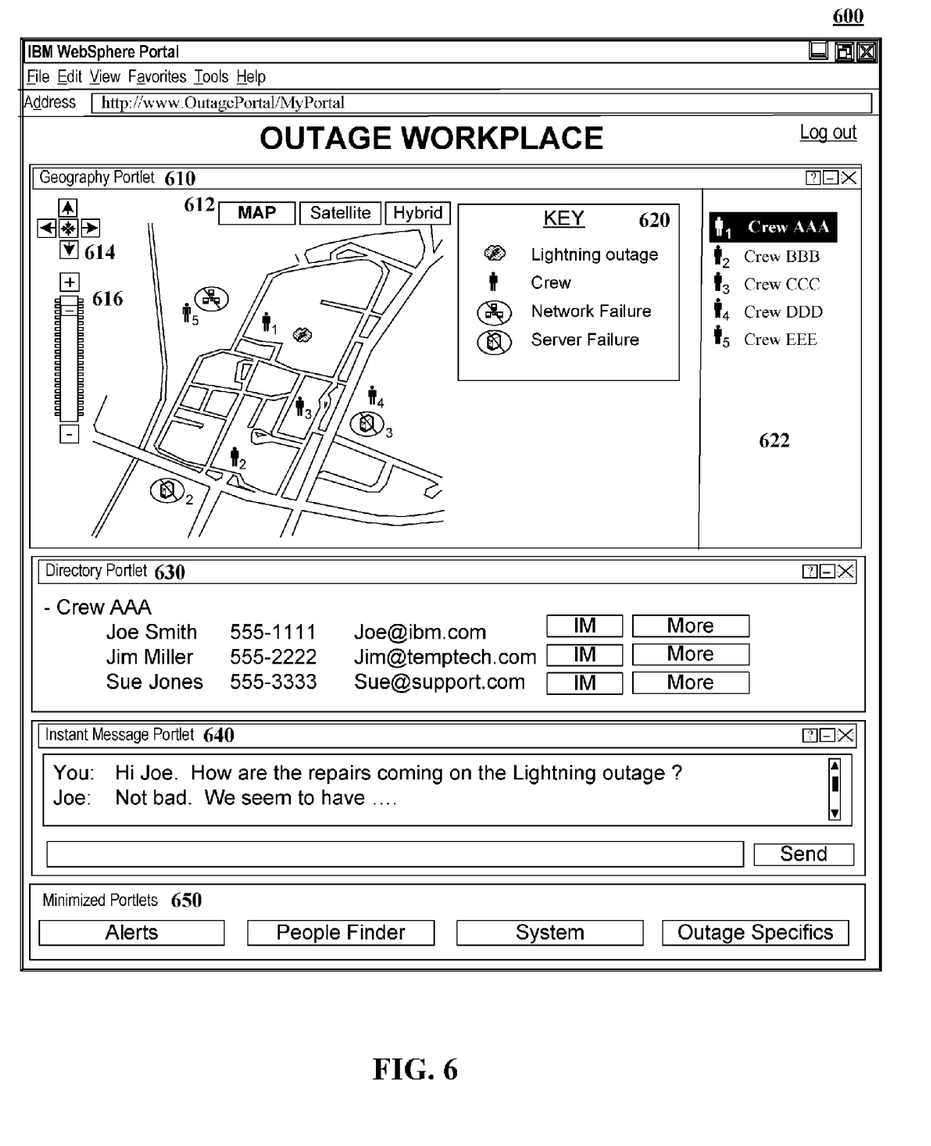
FIG. 6 is a diagram of a sample outage workplace in accordance with an embodiment of the inventive arrangements disclosed herein.
Figure 7:
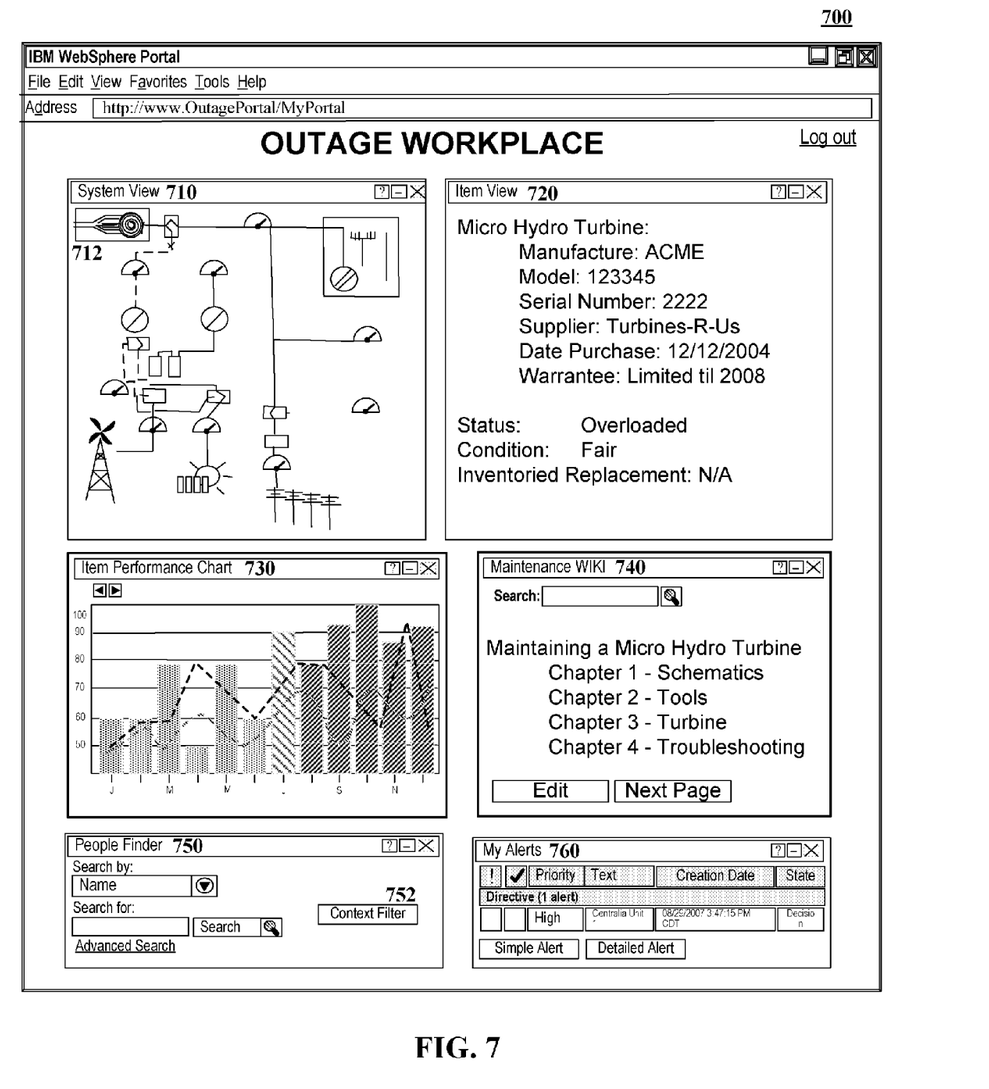
FIG. 7 is a diagram of a sample outage workplace in accordance with an embodiment of the inventive arrangements disclosed herein.

FIGS. 5, 6, and 7 show a few possible user interfaces for a sample outage workplace portal. These interfaces can be implemented in the context of system 100. Each of the interfaces are presented to illustrate a high degree of functional and data integration among various configurable portlets (or views) possible with the present invention. Further, these user interfaces demonstrate a combinatorial effect of using multiple outage portlets to leverage spatially represented data along with specific details to stay on top of the impacts, effects, and logistics of an outage scenario. The demonstrated interfaces can be configured in a role and user specific manner, and can leverage existing presentation, data, and support resources in a novel way targeted for immediate semantic content digestion by any number of different outage responders. Data accessibility, ease of use, extensibility, maintainability, and scalability are ensured by using platform independent standards and Web 2.0 principles. Interface specifics shown in FIGS. 5-7 are for illustrative purposes only, and are not to be construed as an invention limitation.

FIG. 5 is a diagram 500 of a sample outage workplace in accordance with an embodiment of the inventive arrangements disclosed herein.

A content navigator 510 can permit a user to specify a location 512 or a system 516 which are to be displayed in geography view 530 and system view 540, respectively. Alternatively, one or more outage events 514 can be selected, which causes the views 530 and 540 to be adjusted to reflect the area around an outage and the system(s) affected. When multiple geographic regions and systems are affected by an outage selected by control 514, the controls 512 and 516 can be filtered so that only those views and systems affected by the selected outage 514 are offered for selection. Different levels of detail can be expressed for both the geography view 530 and the system view 540.

Both the geography view 530 and the system view 540 can include displayable pop-ups 532 providing detailed information relevant for outages. For example, when a pointer is positioned ("flown") over the icon of an outage in the geography view, pop-up 532 can be automatically presented to provide known details of that outage. The data in views 530 and 540 can be dynamically and automatically updated as related data sources are updated. Those updates can occur in a real-time fashion. For example, the system view 540 can show a current model and continuous operational values for resources within its targeted area, and the like. Both the maps within the geography view 530 and the model within the system view 540 can be structured to permit a user to change the "zoom" or granularity level of data displayed.

In one embodiment, one or more of the views, such as the geography view 530, can incorporate a "mashup", which includes icons, data points, indicators, and the like specific to outages. The base maps "underneath" can be provided from a standard presentation source such as a geographic information system (GIS), which can be unrelated to outage management.

In one embodiment, selections with the geography view 530 and/or the system view 540 can be programmatically linked to the content navigator 510 to effect changes based upon intra-view selections. For example, a control point for a system can be selected from within the geography view 530, which changes the target of selector 516 and the system displayed in view 540. Different roles 550 can cause a different set or different versions of views 530, 540 to be presented. As shown, possible roles can include that of operations, maintenance, and an executive, but any others could be implemented. When a logged-in user has access to multiple roles, the available ones can be enabled in roles section 550.

A number of communication tools 570 can be included in the outage workplace, such as ones for an alerting facility, an instant messaging facility, and a people finder (directory lookup). Each of these tools 570 can be minimized portlets, which can be expanded upon selection. Further, the tools 570 (or associated views) can be customizable, so that a user can add new tools 570 along with portlets or views to their tailored version of the outage workplace. A user can also customize which tools 570 portlets or views are to be initially minimized and which are to be expanded. In one embodiment, the various views 530, 540, 570 of the outage workplace can each be repositioned and/or resized, and a default layout associated with a user can be saved as a user preference. In one embodiment, a number of links and menus 560 can be available. These links and menus 560 can, for example, be selected to access content such as weather, general RSS (syndication) feeds, and miscellaneous documents and reports, etc.

It should be understood that the data sources, the presentation sources, and the support sources involved with outage workplace 500 can have security restrictions. In one embodiment, the middleware responsible for constructing the outage workplace can maintain authentication credentials and can provide them in a user transparent fashion, assuming a user validated for the outage workplace has verified their identity and possesses necessary permissions for the utilized sources.

FIG. 6 is a diagram 600 of a sample outage workplace in accordance with an embodiment of the inventive arrangements disclosed herein. Diagram 600 shows a geography portlet 610, which indicates positions of numerous outage related resources. As shown by key 620, icons on the map include a lightning outage location, crew positions, a network failure location, a server failure location, and the like (for an electric utility, for example, points depicted might refer to line faults, damaged equipment, overloaded equipment, customers, system protection devices, active responders and backups, etc.) Multiple instances of these icons can exist and can be distinctly labeled.

For example, different icons can indicate the positions of various crews, labeled 1-5. Names of the crews can be presented in section 622. Further, selection of a crew in section 622 can cause directory portlet 630 to present the individual members of that crew, along with relevant contact information. One contact mechanism of portlet 630 can be to instant message a crew member, which can occur immediately in instant messaging portlet 640. Various support sources, such as a presence awareness system, an instant messaging system, and a contact management system can be utilized to provide content presented in portlets 610, 630, and 640.

Additionally, functionality for one or more of the portlets can be provided at least in part from a commercial-off-the-shelf service or system. For example, the geography portlet can include controls 614 for repositioning a map, for adjusting a zoom level 616, and for changing map display type 612, all of which could provided by a general mapping service such as Google Maps. The actual outage specific elements (key 620, section 622) and icons can represent a customized extension to the base mapping software.

Diagram 600 also shows a set of minimized portlets 650 which can be expanded. These portlets 650 can include, but are not limited to, an alert portlet, a people finder portlet, a system portlet, and a portlet that details outage specifics.

FIG. 7 is a diagram 700 of a sample outage workplace in accordance with an embodiment of the inventive arrangements disclosed herein. Diagram 700 shows a system view 710. As shown, at item 712 can be surpassing safe operating thresholds and/or can be non-functional.

When this item 712 is selected or hovered over, the item view 720 can provide detailed information about it. This information can include a name, a location, a manufacturer, model number, etc. Selection of different components in view 710 can result in different data automatically being presented in view 720. Further, a performance chart view 730 can show recent and current performance of the component 712 selected in view 710.

In one embodiment, one or more "wiki" views 740 can exist, and can include useful information about the system shown in view 710, a component shown in view 720, or other selected items within the outage workplace. The "wiki" portlet 740 can be used to capture and share lessons learned, best practices, and other information across an organization or among multiple organizations.

The people finder 750 can be a view that assists a user in finding contact information. In one embodiment, different directories or phone books can be established for the people finder 750 which can be automatically filtered for a current state of a system shown in view 710. For example, a user can select a context filter 752 when item 712 is experiencing problems, and contact information for personnel related to that item 712 can be presented in view 750. For example, an inventory control person, an administrator, a maintenance lead, and the like can appear upon selection of the filter button 752.

Diagram 760 further shows a series of system related alerts 760. These alerts 760 can be tailored for a user and/or for a user's organizational position or role related to a system of interest.

The views (or portals) 710-760 are not intended to be comprehensive, but are instead illustrative of some of the possible views contained in an outage workplace. For example, in one embodiment, a "blog" view (not shown) could be used to record a system status for a user of interface 700. The user of the outage portal could be a maintenance agent responsible for a system. Routine activities for a shift could be entered into the "blog" as a record. Additionally, entries about outage "events" could automatically make their way into the "blog", and could have comments subsequently injected by outage workplace users.

It should be emphasized that the outage workplace is tailored based upon user role and user preferences. The interface 700 can, for example, be a tailored outage workplace for a maintenance role. Similarly, interface 600 can be tailored for an operational role. Other roles are contemplated, which would result in more possible customizations for the outage management workplace.

For example, an executive role can use a tailored outage management workplace that shows a mapping view oriented more towards outage impact areas and durations than deployments of individual equipment and response crews. Additionally, trend information, such as historic and forecasted outage times, events, and durations can be presented in a tabular form. Portlets (or views) can be presented for an executive role to show cost-benefit tradeoffs of system upgrades. Further, a mapping portlet can show possible upgrade placements and scenarios, while other portlets may show details about upgrade timelines, crews, costs, etc.

The diagrams in FIGS. 1-7 illustrate the architecture, functionality, and operations of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for implementing a roles based outage management workplace comprising:

serving an outage workplace from a network server to a client used by an identified user, wherein views of said outage workplace comprise a geography view that graphically presents spatially related geographic data illustrating a geographic map corresponding to a network of managed resources, wherein another of said views comprise a system view presenting a schematic of an operational resource within the network of managed resources, wherein the geography view is configured to present a plurality of managed resources upon said geographic map, wherein a selection of one of the resources within the geographic view results in a presentation of data relating to the corresponding operational system being presented in the system view, wherein said outage workplace comprises:

at least one alert view configured to automatically present a notification to at least one user whenever a value of dynamically obtained information or a condition of one of the managed resources exceeds a previously established boundary, wherein at least one user is indicated within a data store to be an individual responsible for taking corrective actions in regard to a situation indicated by the notification wherein when the notification is presented;

a different view of the outage workplace that automatically presents communication specific items to each of the at least one users; and another view of the outage workplace that when the notification is presented, the another view automatically presents documents from a content repository related to the indicated situation and relevant as determined by a set of programmatic rules.

2. The method of claim 1, wherein said outage workplace is a portal and wherein each of said views is a portlet, wherein said method further comprises:

identifying an outage management system for interface customizations based upon at least one of the identified user and a user role; and constructing the outage management workplace for the interface customizations, wherein said outage workplace comprises the plurality of views, each view comprising view specific programmatic code, wherein a state of one view affects a state of at least one other view so that content changes and user interactive changes made to one view result in changes being made to at least one other view.

3. The method of claim 2, wherein the portal is served by a portal server, wherein the portal server is part of a service oriented architecture (SOA), which functions as middleware between back-end and front-end systems.

4. The method of claim 2, wherein said roles comprise an executive role, an operational role, and a maintenance role, said method further comprising:

when said identified user role is the executive role, said outage workplace comprising a plurality of portals comprising outage related information, which is customized for consumption by an executive level user;

when said identified user role is the operational role, said outage workplace comprising a plurality of portals comprising outage related information, which is customized for consumption by an operational level user; and when said identified user role is the maintenance role, said outage workplace comprising a plurality of portals comprising outage related information, which is customized for consumption by a maintenance level user.

5. The method of claim 2, further comprising:
presenting a user with a customization user interface through which the user is able to customize a set of portlets to be presented within the outage management workplace, wherein the set of portlets presented in the customization user interface for user selection varies based upon user role.

6. The method of claim 1, further comprising:
automatically obtaining content from a plurality of network accessible data sources;
processing said obtained content to conform to standards specific to the outage management system which is different from standards of the data sources; and
populating said views with the processed content, wherein at least a portion of the content that is obtained, processed, and used to populate the views is dynamically changing content that is handled in at least one of real-time and near-real-time.

7. The method of claim 2, further comprising:
identifying a plurality of data sources, a plurality of presentation sources, and a plurality of support sources which are each implemented by at least one of back-end computing systems, which are independent of the outage management system, which is implemented in middleware; and
utilizing programmatic instructions of the middleware to leverage and repurpose resources of the data sources, presentation sources, and support sources for a user role and user customized outage management workplace.

8. The method of claim 1, wherein each of the views is an independent and pluggable component of the outage management workplace, said method further comprising:
serving a customization user interface to the client of the identified user;
permitting the identified user to customize each of the views using the customization user interface; and
permitting the user to choose which of the views is to be included within a user customized version of the outage management workplace based upon user input received via the customization user interface.

9. The method of claim 2, wherein the plurality of portlets comprise a portlet for the geography view, a portlet for the system view, and at least two additional portlets selected from a group of portlets consisting of, an alerting portlet, an instant messaging portlet, a "wiki" portlet, a people finder portlet, an outage situation portlet, and an outage situation assigned task list purposed portlet.

10. A portal server comprising:
at least one processor coupled to memory elements through a system bus;
a data store configured to manage digitally encoded customization settings, wherein said customization settings are associated with specific users and comprise user established settings, wherein programmatically implemented customizations are configured to utilize the customization settings when outage workplace portals are served to users
portlet creation software configured to modify a software artifact obtained from at least one presentation source to include data points based upon the obtained outage information, wherein said portlet creation software is further configured to utilize the customization settings from the data store when generating portlets for specific users;
portlet binding software configured to insert code into an outage management portal, which programmatically links a plurality of otherwise independent portlets, wherein the inserted code causes a state of at least one of the portlets to dynamically change based upon at least one of a user interface and a data update to another of the portlets of the outage workplace portal; and
a portal serving component configured to respond to requests from remotely located clients by serving customized outage workplace portals to the remotely located clients, wherein the served outage workplace portals comprise at least a geography portlet and a system portlet, wherein the geography portlet is configured to graphically present spatially related geographic data illustrating a geographic map corresponding to a network of managed resources, and wherein the system portlet is configured to present a schematic of an operational system within the network of managed resources, wherein each of said served outage workplace portals comprise at least one alert portlet configured to automatically present a notification to at least one user whenever a value of dynamically obtained information or a condition of a set of monitored systems exceeds a previously established boundary, wherein at least one user is indicated within a data store to be an individual responsible for taking corrective actions in regard to a situation indicated by the notification wherein when the notification is presented, a portlet of the outage workplace portal automatically presents communication specific items to each of the at least one users, and wherein when the notification is presented, a portlet of the outage workplace portal automatically presents documents from a content repository related to the indicated situation and relevant as determined by a set of programmatic rules.

11. The portal server of claim 10, wherein at least a portion of the served outage workplace portals further comprise at least two portlets selected from a group of portlets consisting of, an alerting portlet, an instant messaging portlet, a "wiki" portlet, a people finder portlet, an outage situation portlet, and an outage situation assigned task list purposed portlet.

12. The portal server of claim 10, further comprising:
collaboration software configured to conduct online collaboration communications responsive to a user selection from within a portlet of a served outage workplace portal; and
Web 2.0 software configured to grant access to a shared organization resource from within a portlet of a served outage workplace portal.

13. The portal server of claim 10, further comprising:
a plurality of role specific programmatically implemented customizations for providing role tailored portals, wherein roles specified by the role specific programmatically implemented customizations comprise an executive role, an operational role, and a maintenance role, each tailored for presentation of outage information to different groups of users;
wherein said outage workplace portals are served by the portal server and comprise a plurality of role and user customized portlets;
fetching software configured to dynamically obtain outage information from at least one back-end data source, wherein the portal server is part of a service oriented architecture (SOA), wherein near-real-time metrics are conveyed from a resource to a middleware service provider, to a service gateway, and then to the portal server.

14. The portal server of claim 12, further comprising:
search software configured to search a Web 2.0 data repository for items specific to an outage event, wherein said search software is triggered by an occurrence of a user customized alert condition relating to a current value of the dynamically obtained outage information, which results in a firing of the outage event, wherein said Web 2.0 software alters content of a portlet of the served Web page to include results produced by the search software.

15. The portal server of claim 14, further comprising:
contact querying software configured to search an organization directory for a set of personnel associated with responding to the outage event, wherein said collaboration software alters content of a portlet of the served Web portal to include results produced by the contact querying software.

16. The portal server of claim 10, wherein the geography portlet incorporates a "mashup" comprising a map and a plurality of overlaid content, wherein said overlaid content is based upon said obtained outage information.

17. A system providing a Web portal comprising:
at least one processor coupled to one or more memory elements through a system bus;
computer program code stored in the one or more memory elements, wherein execution of the computer program code by the at least one processor generates the Web portal;
said Web portal comprising a plurality of portlets, said portlets comprising:
at least one geography portlet, which incorporates a "mashup" comprising a visual map and related interface controls and overlaid content relating to an outage within a network of managed resources, wherein said overlaid content is based upon information dynamically obtained from a plurality of network accessible data sources, and
at least one system portlet, which comprises a schematic of an operational system included within the network of managed resources, wherein the schematic presents real-time information obtained from remotely located system monitoring software that is configured to monitor conditions of the network of managed resources, wherein said overlaid content comprises a plurality of user selectable objects, each corresponding to a different managed resource, wherein a selection one of the user selectable objects in the geography portlet results in content of the system portlet dynamically changing to present content related to the selected managed resource, wherein the geography portlet and the system portlet are customized in accordance with a role of a user and with user established customization settings;
at least one Web 2.0 portlet;
at least one collaboration portlet; and
at least one alert portlet configured to automatically present a notification to at least one user whenever a value of dynamically obtained information or a condition of the monitored systems exceeds a previously established boundary, wherein at least one user is indicated within a data store to be an individual responsible for taking corrective actions in regard to a situation indicated by the notification wherein when the notification is presented, the collaboration portlet automatically presents communication specific items to each of the at least one users, and wherein when the notification is presented, the Web 2.0 portlet automatically presents documents from the content repository related to the indicated situation and relevant as determined by a set of programmatic rules.

18. The system of claim 17, wherein the at least one Web 2.0 portlet configured to share information among a plurality of users, said shared information comprising searchable content repositories of user provided and updated information designed to provide insight relating to outages of the network of managed resources; and wherein the at least one collaboration portlet configured to facilitate communications among a distributed group of users involved in outage management to permit said users to rapidly respond to an outage situation.

19. The system of claim 17, wherein the at least one Web 2.0 portlet configured to share information among a plurality of users, said shared information comprising searchable content repositories of user provided and updated information designed to provide insight relating to outages of the network of managed resources.

20. The system of claim 17, wherein the at least one collaboration portlet configured to facilitate communications among a distributed group of users involved in outage management to permit said users to rapidly respond to an outage situation.

* * * * *